United States Patent [19]

Jayant

[11] 3,903,401

[45] Sept. 2, 1975

[54] SPECTRUM ANALYZER USING DELTA MODULATION ENCODING

[75] Inventor: Nuggehally Sampath Jayant, Summit, N.J.

[73] Assignee: Bell Telephone Laboratories, Incorporated, Murray Hill, N.J.

[22] Filed: June 27, 1974

[21] Appl. No.: 483,899

[52] U.S. Cl............ 235/156; 235/151.3; 324/77 B; 325/38 B; 332/11 D
[51] Int. Cl.²...................... G06F 7/50; G06F 15/34
[58] Field of Search............ 235/151.3, 151.31, 156; 325/38 B; 332/11 D; 324/77 R, 77 B

[56] References Cited
UNITED STATES PATENTS

| | | |
|---|---|---|
| 3,544,894 | 12/1970 | Hartwell et al. ................. 324/77 R |
| 3,581,199 | 5/1971 | Spitz .................................. 324/77 |
| 3,703,688 | 11/1972 | Flanagan ...................... 325/38 B X |
| 3,822,404 | 7/1974 | Croisier et al..................... 325/38 B |

*Primary Examiner*—Charles E. Atkinson
*Assistant Examiner*—Jerry Smith
*Attorney, Agent, or Firm*—H. L. Logan

[57] ABSTRACT

Disclosed are a method and apparatus for computing the power spectrum of an applied analog signal at a chosen frequency, by converting the analog signal into a binary sequence, by separately multiplying the binary sequence by a sequence of cosine and sine functions, by accumulating and squaring the resultant product signals, by adding the squared signals, and by multiplying the added signals with a constant signal which is a function of the chosen frequency.

10 Claims, 2 Drawing Figures

SPECTRUM ANALYZER USING DELTA MODULATION ENCODING

BACKGROUND OF THE INVENTION

This invention pertains to spectrum analysis. More particularly, it pertains to systems for ascertaining the power spectrum of an applied signal at a chosen frequency, or at a plurality of chosen frequencies.

Frequency spectrum analysis is generally performed in digital or analog format depending on the particular requirements of the system with respect to cost, accuracy, stability, format of the applied signal, and the analysis granularity required. For example, the Fast Fourier Transform (FFT) approach to spectrum analysis is generally used when stable and accurate measurements are required at a plurality of frequencies. On the other hand, analog or digital filters are used when bands of frequency, or a few single frequencies, are required to be analyzed. In both the analog and the digital filter approaches the versatility of the filters is somewhat limited, either by analog component variation limitations in the analog case, or by feedback path modifications limitations in the digital case.

It is another object of this invention to provide a system for spectrum analysis of an applied signal at a particular frequency or a plurality of frequencies.

It is another object of this invention to provide a system wherein the analyzing frequency of interest can be easily changed.

It is a further object of this invention to provide for stable digital analysis of an applied signal.

It is a still further object of this invention to analyze applied analog signals by encoding the signals with a one-bit delta modulator, or to analyze delta modulated signals directly.

SUMMARY OF THE INVENTION

These and other objects of the invention are achieved via apparatus comprising a one-bit linear delta modulator which generates a binary signal, $b_r$, alternating between +1 and −1, whose integral corresponds to a stepwise approximation of the input signal divided by a constant $\Delta$. The constant $\Delta$ corresponds to a step size internal to the delta modulator. The apparatus further comprises a cosine and a sine signal generator, two accumulators, two squarers, an adder, and a multiplier, arranged to compute the power spectrum of the input signal at a particular frequency, $f = k/NT$, in accordance with the equation $$Y(f) \frac{\Delta^2}{\sin^2\left(\frac{\pi k}{N}\right)} \{[P(k)]^2 + [Q(k)]^2\} \quad (1)$$

where $$P(k) = \sum_{r=1}^{N} b_r \left(\cos \frac{2\pi r k}{N} - \cos \frac{2\pi k}{N}\right), \quad (2)$$

$$Q(k) = \sum_{r=1}^{N} b_r \left(\sin \frac{2\pi r k}{N} - \sin \frac{2\pi k}{N}\right), \quad (3)$$

$N$ is the total number of signals generated by the delta modulator, $k$ is an integer related to the analyzing frequency which can range from 1 to $N$, and $T$ is the periodicity of the delta modulator clock.

DETAILED DESCRIPTION

Figure 1:
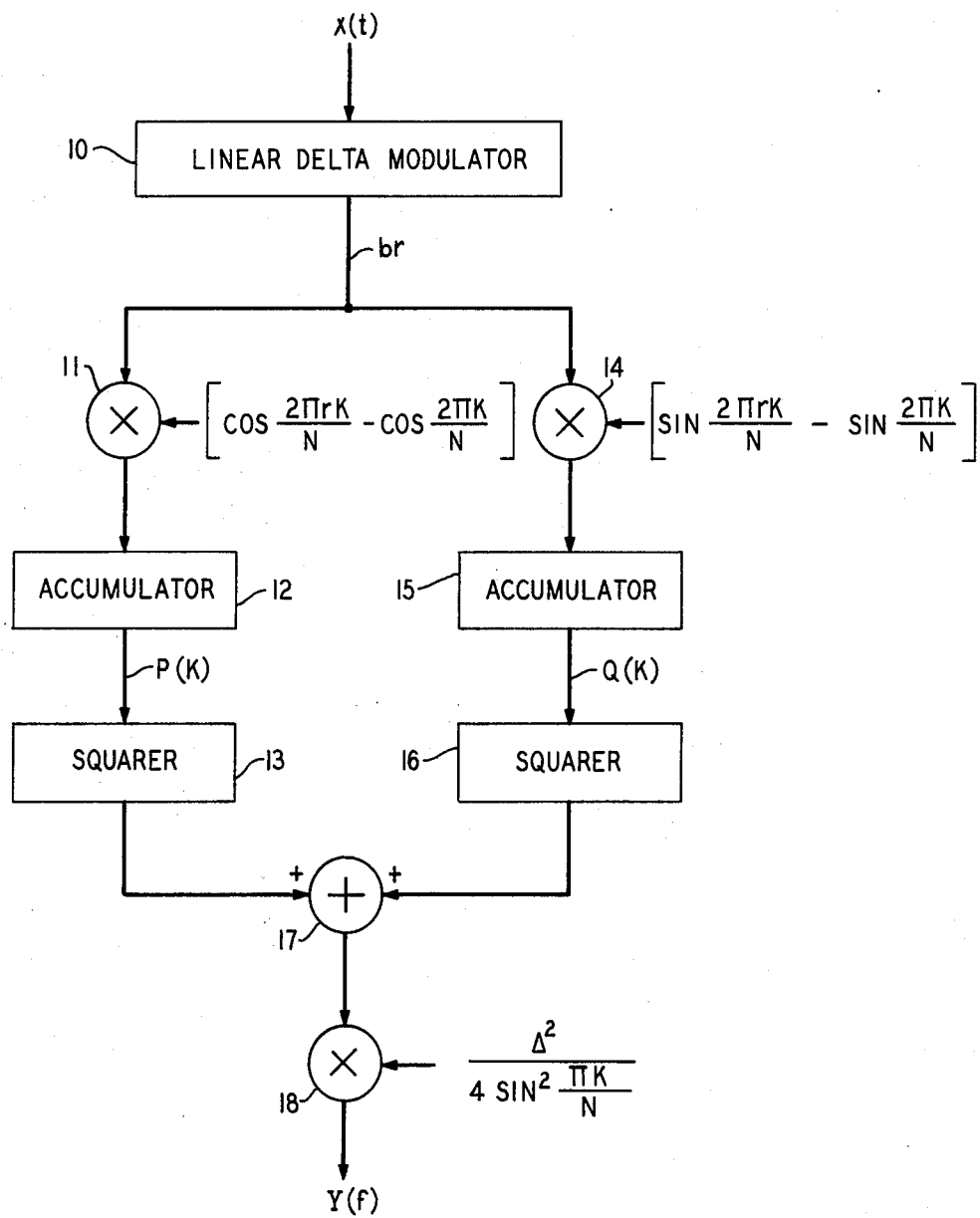
FIG. 1 illustrates a general block diagram of the spectrum analyzer of this invention.

Before describing the embodiment of this invention, a brief discussion is presented of some theoretical considerations relevant to the invention.

The principles of linear delta modulation (LDM), as described, for example, by J. E. Abate in an article entitled, "Linear and Adaptive Delta Modulation," *Proceedings of the IEEE*, March 1967, pp. 298–308, are well known in the communication art. Briefly summarized, LDM is a quantizing technique where a band-limited input signal $x(t)$ is approximately by a staircase signal $y(t)$. The staircase signal comprises steps of size $\Delta$ that follow, in polarity, the sign of the difference signal $(x_r - y_{r-1})$ at an LDM clock frequency of $1/T$. The signals $x_r$ and $y_{r-1}$ refer to value of signals $x(t)$ and $y(t)$, respectively, at the $r^{th}$ and the $(r-1)^{th}$ clock periods. Stated mathematically $$y_r = y_{r-1} + \Delta b_r. \quad (4)$$

for $r > 0$, where $$b_r = \text{sgn}(x_1 - Y_{r-1}) \equiv \pm 1, \quad (5)$$

or $$Y_r = \sum_{u=1}^{r} \Delta b_u. \quad (6)$$

If a segment of the signal $y$ is selected comprising $N$ clock periods, a Fourier transform of the segment, $X'(f)$, can be defined for any frequency $f = k/NT$ to be $$X'(f) = \sum_{r=1}^{N} Y_r \exp\left(-j2\pi \frac{rk}{N}\right). \quad (7)$$

It can be shown that $X'(f)$ closely approximates the transform of the input signal $x(t)$ when the staircase signal $y(t)$ closely approximates the input signal $x(t)$. Utilizing equation (6), $X'(f)$ can be rewritten as $$X'(f) = \Delta \sum_{r=1}^{N} \sum_{u=1}^{r} b_u \exp\left(-j\frac{2\pi r k}{N}\right), \quad (8)$$

and by expanding the double summation and grouping the terms involving a given $b_r$, it can be shown that $$X'(f) = \frac{\Delta}{1-\exp(-j2\pi k/N)} \left[\sum_{r=1}^{N} b_r \exp(-j2\pi k r/N) - \exp\left(-j2\pi k\left[1+\frac{1}{N}\right]\right) \sum_{r=1}^{N} b_r\right] \quad (9)$$

Multiplying the numerator and denominator by $[1 - \exp(j2\pi k/N)]$ and noting that $\exp(-j2\pi k) = 1$ for all $k$, equation (9) may be rewritten as $$X'(f) = \frac{\Delta \exp(\frac{j\pi k}{N})}{2j\sin(\frac{\pi k}{N})} \sum_{r=1}^{N} \left[ b_r \exp(-j\frac{2\pi kr}{N}) - \exp(-j\frac{2\pi k}{N}) \right]. \quad (10)$$

Defining $$P(k) = \sum_{r=1}^{N} b_r \left( \cos \frac{2\pi rk}{N} - \cos \frac{2\pi k}{N} \right) \quad (11)$$

and $$Q(k) = \sum_{r=1}^{N} b_r \left( \sin \frac{2\pi rk}{N} - \sin \frac{2\pi k}{N} \right) \quad (12)$$

it can be shown that the power spectrum $Y(f)$ of the $Y_r$ signal, defined by $|X'(f)|^2$, can be expressed by $$Y(f) = \frac{\Delta^2}{4 \sin^2\left(\frac{\pi k}{N}\right)} \{[P(k)]^2 + [Q(k)]^2\}. \quad (13)$$

Accordingly, the power spectrum of an applied signal at a particular frequency can be computed by converting the signal $x(t)$ into a sequence of $b_r$ signals, and by manipulating the $b_r$ signals in accordance with equations (11), (12) and (13). These manipulations involve the squaring and adding of the two independent factors, $P(k)$ and $Q(k)$, and the multiplication of the sum with a constant which is dependent on the particular frequency being analyzed. The terms $P(k)$ and $Q(k)$ are simple summations of cosine and sine terms multiplied by the $b_r$ signals which assume the values ±1.

Turning to a particular embodiment of this invention, FIG. 1 illustrates the general block diagram of the apparatus of this invention. Linear modulator 10 converts an applied input signal into a sequence of $b_r$ signals in accordance with equation (6). The $b_r$ signals are applied to multipliers 11 and 14 wherein each $b_r$ signal multiplies a $(\cos 2\pi rk/N - \cos 2\pi k/N)$ signal and a $(\sin 2\pi rk/N - \sin 2\pi k/N)$ signal, respectively. The resultant product signals are accumulated $N$ times in accumulators 12 and 15 to develop the signals $P(k)$ and $Q(k)$, respectively, in accordance with equations (11) and (12). Signals $P(k)$ and $Q(k)$ are squared in squarers 13 and 16, and their output signals are summed in adder 17. The output signal of summer 17 is applied to multiplier 18 wherein it is multiplied by a constant signal, representative of the quantity $$\frac{\Delta^2}{4 \sin^2\left(\frac{\pi k}{N}\right)},$$

to develop the desired power spectrum signal in accordance with equation (13).

A careful study of the above cosine and sine multiplicative factors reveals a number of interrelationships which may be advantageously utilized in either a hardware or a software implementation of the apparatus of FIG. 1. Specifically, for each accumulation sequence in accumulators 12 and 15, the only variable values are $b_r$ and the $rk$ factor in the terms $\cos 2\pi rk/N$ and $\sin 2\pi rk/N$. The terms $\cos 2\pi rk/N$ and $\sin 2\pi k/N$ are constant during each accumulation pass because both $k$ and $N$ are constant. Therefore, since the terms $\cos 2\pi rk/N$ and $\sin 2\pi rk/N$ must repeatedly be computed for different $rk$ values, as $r$ increases during an accumulation pass from 1 to $N$, the value of the terms $\cos 2\pi k/N$ and $\sin 2\pi k/N$ may conveniently be strobed into a pair of registers when the terms $\cos 2\pi rk/N$ and $\sin 2\pi rk/N$ are computed for $r = 1$.

Additionally, it is well known that sine terms can easily be computed from cosine terms, and that since the cosine function is an even function with amplitude symmetry, the value of the cosine function in any quadrant can easily be determined by evaluating the proper cosine function in the first quadrant. Accordingly, computation of $\cos 2\pi rk/N$ and $\sin 2\pi rk/N$ can be implemented by sequentially storing in a read-only-memory (of $N/4$ memory addresses) the $\cos 2\pi rk/N$ values within the first quadrant, for $rk$ ranging from 1 to $N/4$, and by manipulating the memory address and the sign of the memory output signal in accordance with Table 1.

Table 1

| argument | cosine address | sign | sine address | sign |
|---|---|---|---|---|
| $0 < rk \leq N/4$ | $rk$ | + | $N/4 - rk$ | + |
| $N/4 < rk \leq N/2$ | $N/2 - rk$ | − | $rk - N/4$ | + |
| $N/2 < rk \leq 3N/4$ | $rk - N/2$ | − | $3N/4 - rk$ | − |
| $3N/4 < rk \leq N$ | $N + rk$ | − | $rk - 3N/4$ | − |

If the argument $rk$ is presented in binary format, the two most significant bits in the representation of $rk$, $m_1$ and $m_2$, directly subdivide the cosine argument into the above four quadrants. It can be shown that by stripping the $m_1$ and $m_2$ bits from the representation of $rk$, forming an $rk'$ representation, all of the address computations of Table 1 degenerate to complementations (2's complement) of the $rk'$ signal. It can also be shown that the output signal negations can be controlled by simple logic combinations of the $m_1$ and $m_2$ bits. Finally, to accommodate the computation of the cosine and sine terms from one ROM, each computation cycle may be divided into two halves; during one-half of the computation cycle the cosine term may be computed, and during the second one-half of the computation cycle the sine term may be computed. This can be implemented by the use of a symmetric clock signal ANDed with the various control signals. The above computational simplifications are summarized in Table 2.

Table 2

| $m_1 m_2$ | Cosine (Clock Low) | | | Sin (Clock High) | | |
|---|---|---|---|---|---|---|
| | Add. | Control | Sign | Add. | Control | Sign |
| 0 0 | $rk'$ | | + | $\overline{rk'}$ | | + |
| 0 1 | $\overline{rk'}$ | $m_2$ | − | $m_1 \oplus m_2$ | $rk$ | $\overline{m_2}$ | + | $m_1$ |
| 1 0 | $rk'$ | | − | $\overline{rk'}$ | | − |
| 1 1 | $\overline{rk'}$ | | + | $rk$ | | − |

Figure 2:
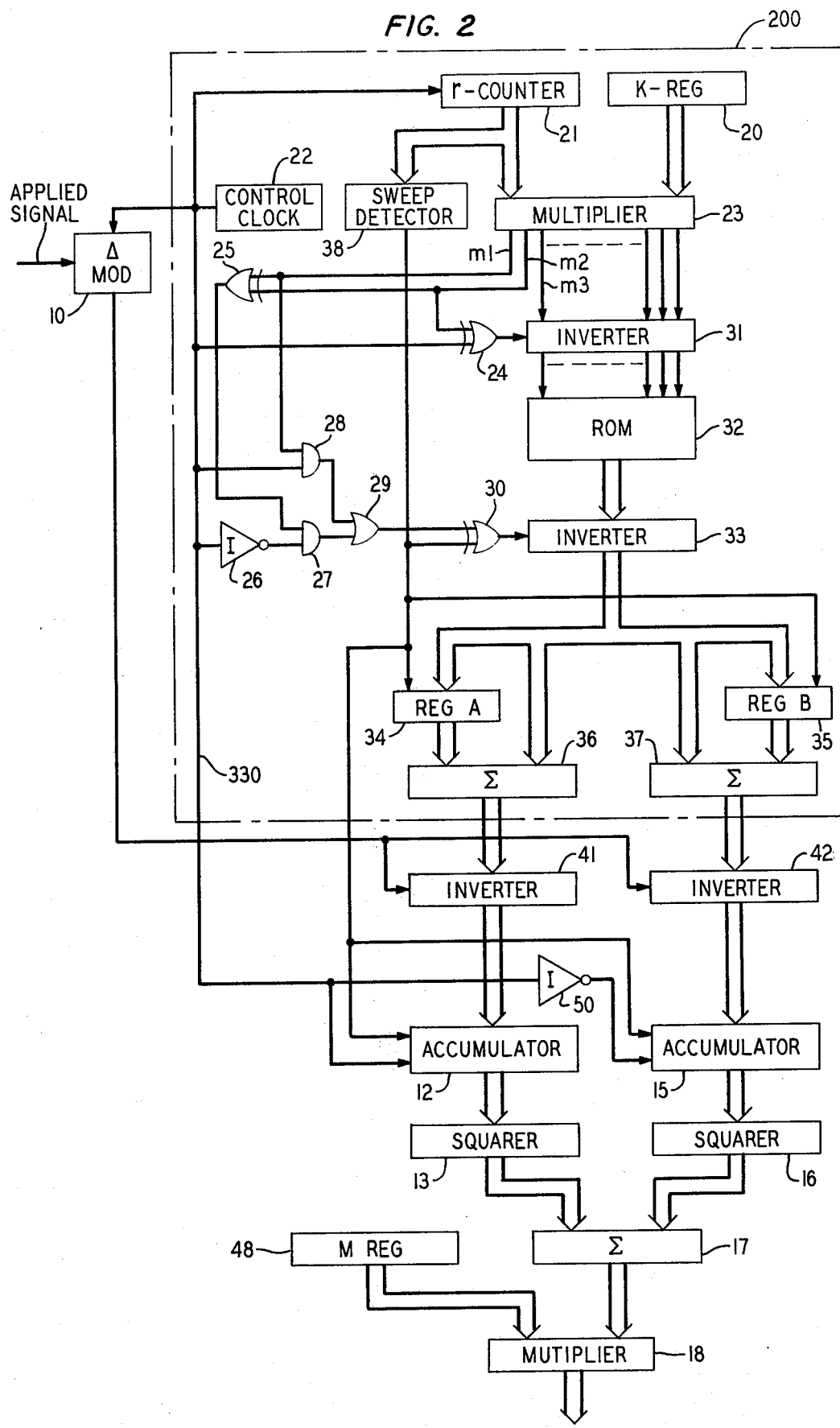
FIG. 2 depicts a more detailed block diagram of the analyzer of FIG. 1.

The detailed block diagram of FIG. 2 incorporates the above simplifications in the cosine and sine multiplicative factors' computation. Element 200 includes the circuitry for generating the appropriate cosine and sine terms. Therein, a $k$-register 20 stores the desired analyzing frequency as it is reflected by the variable $k = NTf$. The value of $k$ is inserted into register 20 by the user, or alternatively, may automatically be incremented after each pass, effecting an increase in the analyzing frequency. A binary counter 21 maintains the current value of the variable $r$ in equations (11) and (12), and is incremented modulo $N$ by a symmetric clock signal derived from control clock 22. The clock signal is periodic in $T$. Multiplier 23, which is a simple binary multiplier, as described, for example, by Kindell et al. in U.S. Pat. No. 3,730,425, issued May 1, 1973, is connected to counter 21 and to $k$-register 20 to develop the product signal, $rk$. The $rk$ product signal, subsequent to manipulation in accordance with Tables 1 and 2, forms the address to a read-only-memory (ROM) 32 which contains appropriate cosine values. More specifically, the two most significant bits of the $rk$ product signal at the output of multiplier 23, $m_1$ and $m_2$, are combined in accordance with Table 2 to form a control signal for effecting 2's complement inversion of the memory address as defined by the $rk'$ product signal, and a control signal for effecting 2's complement inversion of the signed output signal of ROM 32.

In accordance with Table 2, therefore, the $m_2$ signal and the clock signal are connected to an Exclusive OR gate 24 whose output is connected to inverter 31. Inverter 31 is interposed between the $rk'$ signal of multiplier 23 and the address port of ROM 32. Inverter 31 is a simple 2's complement inverter, well known in the art, controlled by the output signal of gate 24. Thus, in accordance with Table 2, when the clock signal is low, inverter 31 is controlled by $m_2$, while when the clock signal is high, inverter 31 is controlled by $\overline{m}_2$. Also in accordance with Table 2, gates 25 through 29, inclusive, are arranged to develop the Boolean expression $$m_1 \text{ clock} + (m_1 \oplus m_2) \overline{\text{clock}}$$

at the output of gate 29; and the output signal of gate 29 is utilized to control the negation of the signal value at the output of ROM 32. The negation of the output signal of ROM 32 is achieved by 2's complement inverter 33 responsive to the output signal of ROM 32 and under control of the output signal of gate 29. The output signal of inverter 33 is connected to registers 34 and 35, and to binary summers 36 and 37.

Additional control signals, necessary for the strobing of signals cos $2\pi k/N$ and sin $2\pi k/N$ and for initialization of accumulators 12 and 15, hereinafter described, are developed with the aid of a sweep detector 38 connected to counter 21. Detector 38 is a simple word detector arranged to detect the state $r = 1$ in counter 21. The output signal of detector 38 is a short pulse, possibly on the order of $T/4$ seconds, which negates whatever output signals inverter 33 is required to generate, and stobes the negated signals into registers 34 and 35. Thus, registers 34 and 35 are made to store the value of $-\cos 2\pi k/N$ and $-\sin 2\pi k/N$, respectively. The negation of the ROM cosine and sine output signals in response to the output signal of sweep detector 38 is accomplished by an Exclusive OR gate 30 responsive to the output signal of detector 38 and interposed between OR gate 29 and the complementation control port of inverter 33. Accordingly, when sweep detector 38 produces a logic 1 output signal, gate 30 causes the negation of whatever the sign of the ROM output signal would have been in response to the control signal of gate 29.

The output signal of ROM 32 and the output signal of register 34 are added in binary summer 36. When the clock signal is low and proper inversion control signals are applied to inverter 33, the output signal of summer 36 represents the signal (cos $2\pi rk/N$ − cos $2\pi k/N$). Similarly, the output signal of ROM 32 and the output signal of register 35 are added in a binary summer 37 and when the clock signal is high, the output signal of summer 37 represents the signal (sin $2\pi rk/N$ − sin $2\pi k/N$). The output signals of summers 36 and 37 comprise the output signals of element 200.

In accordance with the principles of this invention, FIG. 2 further includes a linear delta modulator 10 which converts an applied analog signal into a sequence of binary signals $b_r'$ alternating between logic 1 and 0 under control of clock 22 signal having the period $T$. The period $T$ must, of course, be low enough to insure proper operation of the system. It has been found, for example, that when it is desired to preserve the resonances of the short-term spectra of applied speech signal, a value of $T$ equal to about $0.1 T_o$, where $T_o$ is the Nyquist period of the band limited speech signal, is satisfactory. The signals $b_r'$ correspond to the theoretical sequence $b_r$ of equation (5), except that the $+1$ and $-1$ values of $b_r$ are replaced with logic 1 and logic 0 levels, respectively. The $b_r'$ sequence is applied in FIG. 2 to 2's complement inverters 41 and 42 which serve as multipliers 11 and 14 of FIG. 1. Inverter 41 is connected to summer 36 and inverter 42 is connected to summer 37. Thus, the output signals of inverters 41 and 42 represent the signals $b_r$ (cos $2\pi rk/N$ − cos $2\pi k/N$) and $b_r$ (sin $2\pi rk/N$ − $2\pi k/N$), respectively. These signals are applied to accumulators 12 and 15, respectively, to form the accumulated sums $P(k)$ and $Q(k)$ as defined by equations (11) and (12). The control clock signal on lead 330, is connected to accumulator 12 for accumulating and strobing the output signal of inverter 41 into accumulator 12 when the clock signal is high. The control clock signal of lead 330 is inverted by inverter gate 50, and the inverted clock signal at the output of gate 50 is connected to accumulator 15 for accumulating and strobing the output signal of inverter 42 when the control clock signal is low. The output signal of sweep detector 38 clears accumulators 12 and 15 at the beginning of each analysis sweep, when $r = 1$.

The output signals of accumulators 12 and 15 are connected to squarers 13 and 16, respectively. Squarers 13 and 16 are binary multiplier circuits, similar to multiplier 23, arranged to form the square of a single input signal. The output signals of squarers 13 and 16 are summed in a binary adder 17, and the output signal of adder 17 is multiplied in binary multiplier 18 by a constant signal representative of the quantity $$\frac{\Delta^2}{4 \sin^2 \left( \frac{\pi k}{N} \right)}$$

The output signal of multiplier 18 represents the desired power spectrum signal of equation 13. The constant signal applied to multiplier 18 is contained in a register 48, whereto it is inserted by the user at the same time, and in the same manner, that the $k$ value is inserted into register 20.

It is to be understood that the embodiment shown and described herein is only illustrative of the principles of this invention and that modification of same may be implemented by those skilled in the art without departing from the spirit and scope of this invention. For example, if the number $N$ is relatively small, a $Y(f)$ signal in accordance with equation (13) can be obtained by accessing an ROM table, having $2^N$ memory location, at an address defined by the $N$ $b_r$ signals, in which address the $Y(f)$ signal has been prestored.

What is claimed is:

1. Apparatus for developing a signal representative of the power at a preselected frequency of a predtermined time segment of a delta modulated signal comprising:
   first means for multiplying said delta modulated signal with a cosine signal having its argument dependent on said preselected frequency;
   second means for multiplying said delta modulated signal with a sine signal having its argument identical to that of said cosine signal;
   third means for accumulating said first means output signal;
   sixth means for squaring said third means output signal;
   fourth means for accumulating said second means output signal;
   seventh means for squaring said fourth means output signal; and
   fifth means for adding the output signals of said sixth and seventh means.

2. The apparatus of claim 1, further comprising:
   a multiplier for multiplying the output signal of said fifth means with a constant signal of a magnitude that is a function of said preselected frequency.

3. Apparatus for developing a signal representative of the power at a preselected frequency of a predetermined time segment of a delta modulated signal comprising:
   first means for multiplying said delta modulated signal with a trigonometric function comprising a difference of cosine signals having arguments dependent on said preselected frequency;
   second means for multiplying said delta modulated signal with a trigonometric function comprising a difference of sine signals having arguments identical to those of said cosine signals;
   third means for accumulating said first means output signal;
   fourth means for accumulating said second means output signal;
   fifth means for squaring said third means output signal;
   sixth means for squaring said fourth means output signal; and
   seventh means for adding the output signals of said first and sixth means.

4. Apparatus for developing a signal representative of the power at a preselected frequency of a predetermined time segment of a delta modulated signal comprising:
   first means, for generating a difference of cosine signals having arguments dependent on said preselected frequency;
   second means, for generating a difference of sine signals having arguments identical to those of said cosine signals;
   third means for developing a first product signal of said delta modulated signal with said first means output signal;
   fourth means for developing a second product signal of said delta modulated signal with said second means output signal;
   fifth means for accumulating said first product signal;
   sixth means for accumulating said second product signal;
   seventh means for squaring the output signal of said fifth means;
   eighth means for squaring the output signal of said sixth means; and
   ninth means for adding the output signals of said seventh and eighth means.

5. The apparatus of claim 4, further comprising a multiplier for multiplying the output signal of said means for adding with a constant signal of a magnitude that is a function of said preselected frequency.

6. Apparatus for developing a signal representative of the power at a preselected frequency of a preselected time segment of an applied signal comprising:
   a linear delta modulator responsive to said applied signal for generating a binary delta modulated signal;
   first means, for generating a difference of cosine signals having arguments dependent on said preselected frequency;
   second means, for generating a difference of sine signals having arguments identical to those of said cosine signals;
   a first multiplier for multiplying said delta modulated signals with said first means output signal;
   a second multiplier for multiplying said delta modulated signal with said second means output signal;
   a first accumulator for accumulating the output signal of said first multiplier;
   a second accumulator for accumulating the output signal of said second multiplier;
   third means for squaring the output signal of said first accumulator;
   fourth means for squaring the output signal of said second accumulator;
   fifth means for adding the output signals of said third and four means; and
   a multiplier for multiplying the output signal of said fifth means for adding with a constant signal having a magnitude that is a function of said frequency.

7. The apparatus of claim 1 wherein said linear delta modulator's binary output signal alternates between $+1$ and $-1$.

8. Apparatus for developing a signal representative of the power at a selected frequency, $f$, of a predetermined time segment of an applied signal comprising:
   a linear delta modulator of input step size $\Delta$, responsive to an NT seconds segment of an applied signal and to a clock signal having a period $T$, developing a binary signal $b_r$ having values $+1$ and $-1$, where $r$ indicates the time position of $b_r$ and ranges from 1 to $N$;
   a cosine generator providing a signal $$\cos\frac{2\pi rk}{N} - \cos\frac{2\pi k}{N}, \text{ where } k = NTf;$$

a sine generator providing a signal $$\sin \frac{2\pi rk}{N} - \sin \frac{2\pi k}{N'}, \text{ where } k = NTf;$$

a first multiplier responsive to said binary signal and to said cosine generator's output signal for developing the product signal $$b_r \left( \cos \frac{2\pi rk}{N} - \cos \frac{2\pi k}{N} \right);$$

a second multiplier responsive to said binary signal and to said sine generator's output signal for developing the product signal $$b_r \left( \sin \frac{2\pi rk}{N} - \sin \frac{2\pi k}{N} \right);$$

a first accumulator responsive to the output signal of said first multiplier for developing a P(k) signal corresponding to $$\sum_{r=1}^{N} b_r \left( \cos \frac{2\pi rk}{N} - \cos \frac{2\pi k}{N} \right);$$

a second accumulator responsive to the output signal of said second multiplier for developing a Q(k) signal corresponding to $$\sum_{r=1}^{N} b_r \left( \sin \frac{2\pi rk}{N} - \sin \frac{2\pi k}{N} \right);$$

first means for squaring the output signal of said first accumulator to develop a $[P(k)]^2$ signal;
second means for squaring the output signal of said second accumulator to develop a $[Q(k)]^2$ signal;
means for adding the output signals of said first and second means for squaring to develop a $[P(k)]^2 + [Q(k)]^2$ signal; and
means for multiplying the output signal of said means for adding with a constant signal $$\frac{\Delta^2}{4 \sin^2 \left( \frac{\pi k}{N} \right)}$$

to develop the signal $$\frac{\Delta^2}{4 \sin^2 \left( \frac{\pi k}{N} \right)} \{[P(k)]^2 + [Q(k)]^2\}.$$

9. A spectrum analyzer tuned to a frequency $f$ and responsive to an applied input signal of duration $M$ seconds comprising:
first means responsive to said applied input signal and to a clock signal having a period $T$ seconds for developing a binary signal alternating between $+1$ and $-1$ where the integral of said binary signal forms a stepwise approximation of said applied input signal divided by a constant $\Delta$;
means for generating first trigonometric signals $$\left( \cos \frac{2\pi rk}{N} - \cos \frac{2\pi k}{N} \right)$$

and second trigonometric signals $$\left( \sin \frac{2\pi rk}{N} - \sin \frac{2\pi k}{N} \right)$$

in synchronism with said clock signal, where $N = M/T$, $k = NTf$, and $r$ increments from 1 through $N$;
first means for multiplying said binary signal with said first trigonometric signals;
second means for multiplying said binary signal with said second trigonometric signals;
third means for accumulating said first means output signals;
fourth means for accumulating said second means output signals;
first means for squaring the output signal of said third means;
sixth means for squaring the output signal of said fourth means;
means for adding the squared signals of said fifth and sixth means; and
means for multiplying said added signals with a constant signal representative of the value $$\frac{\Delta^2}{4 \sin^2 \left( \frac{\pi k}{N} \right)}$$

10. The method of generating a power spectral estimate of an incoming signal at a preselected frequency comprising the steps of:
converting a time segment of said incoming signal in accordance with linear delta modulation techniques into a sequence of N binary signals, $b_r$, having values $\pm 1$ at a rate of $1/T$ Hz, where $r$ is a variable incrementing from 1 to $N$;
multiplying each of said binary signals by a difference of cosine signals whose arguments are dependent on said preselected frequency and on said $r$ variable to develop a sequence of $N$ first signals;
multiplying each of said binary signals by a difference of sine signals whose arguments are identical to those of said cosine signals to develop a sequence of $N$ second signals;
accumulating said sequence of $N$ first signals;
accumulating said sequence of $N$ second signals;
independently squaring the resultant signals of said two accumulating steps;
adding said squared signals; and
multiplying said added signals with a constant signal having a magnitude that is a function of said preselected frequency.

* * * * *

UNITED STATES PATENT AND TRADEMARK OFFICE
CERTIFICATE OF CORRECTION

PATENT NO. : 3,903,401
DATED : September 2, 1975
INVENTOR(S) : Nuggehally S. Jayant It is certified that error appears in the above-identified patent and that said Letters Patent are hereby corrected as shown below:

Column 1, line 24, "another" should read --an--, line 25 "a sys-" should read --apparatus--. Column 2, line 18, "approximately" should read --approximated--; line 31, that portion of equation (5) "$(x_1-Y_{r-1})$" should read --$(x_r-y_{r-1})$--. Column 3, line 20, "$Y_r$" should read --$y_r$--. Column 4, line 3, "The terms cos" should not be italicized. Column 5, line 62, "stobes" should read --strobes--. Column 6, line 40 "Q" should read --Q(k)--; line 41 delete "(k)";

Column 7, line 60, "first" should read --fifth--.
Column 10, line 26, "first" should read --fifth--.

Signed and Sealed this thirtieth Day of March 1976

[SEAL]

Attest:

RUTH C. MASON
*Attesting Officer*

C. MARSHALL DANN
*Commissioner of Patents and Trademarks*